(12) United States Patent
Pefkianakis et al.

(10) Patent No.: US 11,432,313 B2
(45) Date of Patent: Aug. 30, 2022

(54) DETECTING CELLULAR NETWORK BOTTLENECKS THROUGH ANALYSIS OF RESOURCE ALLOCATION PATTERNS

(71) Applicant: Apple Inc., Cupertino, CA (US)

(72) Inventors: Ioannis Pefkianakis, Palo Alto, CA (US); Madhusudan Chaudhary, Campbell, CA (US); Swaminathan Balakrishnan, Santa Clara, CA (US); Muthukumaran Dhanapal, Dublin, CA (US); Lakshmi Kavuri, Cupertino, CA (US); Thanigaivelu Elangovan, Santa Clara, CA (US); Ajoy K. Singh, Milpitas, CA (US); Deepankar Bhattacharjee, Milpitas, CA (US); Gaurav Pathak, Cupertino, CA (US); Carola Faronius, Jarfalla, CA (US); Franco Travostino, San Jose, CA (US); Raghuveer Mallikarjun, Cupertino, CA (US); Harshit Chuttani, Newark, CA (US); Sreevalsan Vallath, Dublin, CA (US); Rajesh Ambati, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 16/888,555

(22) Filed: May 29, 2020

(65) Prior Publication Data
US 2021/0377983 A1 Dec. 2, 2021

(51) Int. Cl.
*H04W 72/12* (2009.01)
*H04W 72/04* (2009.01)
(Continued)

(52) U.S. Cl.
CPC ....... *H04W 72/1273* (2013.01); *H04L 5/0044* (2013.01); *H04L 43/0882* (2013.01);
(Continued)

(58) Field of Classification Search
CPC ......... H04W 72/1273; H04W 72/0446; H04W 72/0493; H04W 72/1486; H04W 16/10;
(Continued)

(56) References Cited

U.S. PATENT DOCUMENTS 7,171,160 B2   1/2007 Chuah et al.
9,544,812 B2   1/2017 Grinshpun et al.
(Continued)

OTHER PUBLICATIONS

Michelinakis, et al., "Lightweight Mobile Bandwidth Availability Measurement," ISBN 978-3-901882-68-5, IEEE 2015, IFIP, available at http://eprints.networks.imdea.org/1035/1/PID3634195.pdf, nine pages.

*Primary Examiner* — Ricardo H Castaneyra
(74) *Attorney, Agent, or Firm* — Kowert, Hood, Munyon, Rankin & Goetzel, P.C.

(57) ABSTRACT

A system and method for operation of a user equipment (UE) to determine a cellular network bottleneck in a downlink channel, and an apparatus for use in a UE for determining the same. A UE may determine a burst of network traffic from network traffic received from the cellular network during a series of transmission time intervals. The UE may analyze resource allocations to the UE during the burst to determine an extent to which the cellular network is busy. The UE may determine that the cellular network is experiencing a bottleneck based at least in part on the analysis of the resource allocations to the UE in the burst.

20 Claims, 14 Drawing Sheets

*Bottleneck Determination Algorithm Flowchart*

(51) Int. Cl.
*H04L 5/00* (2006.01)
*H04W 28/02* (2009.01)
*H04L 43/0882* (2022.01)
*H04W 16/10* (2009.01)

(52) U.S. Cl.
CPC ....... *H04W 16/10* (2013.01); *H04W 28/0231* (2013.01); *H04W 28/0284* (2013.01); *H04W 28/0289* (2013.01); *H04W 72/0446* (2013.01); *H04W 72/0493* (2013.01)

(58) Field of Classification Search
CPC ......... H04W 28/0231; H04W 28/0284; H04W 28/0289; H04W 24/08; H04W 74/085; H04L 5/0044; H04L 43/0882; H04L 47/11; H04L 47/10
See application file for complete search history.

(56) References Cited

U.S. PATENT DOCUMENTS

| | | |
|---|---|---|
| 10,165,576 B2 | 12/2018 | Sen et al. |
| 2018/0270711 A1* | 9/2018 | Moon ..................... H04L 47/11 |
| 2019/0150197 A1* | 5/2019 | Sheu ..................... H04W 72/02 370/329 |
| 2019/0174349 A1* | 6/2019 | Sun ................... H04W 28/0289 |
| 2020/0029245 A1* | 1/2020 | Khoryaev ............ H04B 17/318 |
| 2020/0100263 A1 | 3/2020 | Gupta et al. |
| 2020/0229041 A1* | 7/2020 | Nguyen ................ H04W 28/26 |

* cited by examiner

DETECTING CELLULAR NETWORK BOTTLENECKS THROUGH ANALYSIS OF RESOURCE ALLOCATION PATTERNS

FIELD OF THE INVENTION

The present application relates to wireless networks for user equipment (UE) devices, and more particularly to a system and method for passively determining bottlenecks in a cellular network.

DESCRIPTION OF THE RELATED ART

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc. Networks associated with these standards are known as radio access networks (RANs).

Data flow in a network is subject to the bandwidth of the various resources and devices on the system supported by the network. When a high volume of data is attempting to flow through the network and there is insufficient bandwidth support, bottlenecks and network congestion may occur. The continued increase in the popularity of mobile data applications has led to an increase in both the number of UEs using a cellular network and the overall consumption of mobile data on a cellular network. At times, these increases have led to bottlenecks.

A network bottleneck refers to a condition in which data flow (e.g., transmission of data from a base station to a UE) is limited by insufficient computer or network resources or poor wireless link performance (e.g., poor signal strength or interference). The term "network congestion" may also be used to refer to a bottleneck. Bottlenecks may result in highly undesirable conditions such as slow communication speeds, poor application performance, application failures, and limitations to user efficiency and productivity on a network. As a result, a number of approaches have been implemented to determine and manage network bottlenecks.

The determination of radio access technology (RAT) bottlenecks at the UE is a very important, yet challenging problem, especially in the downlink (from a base station to a UE). If a UE can determine that a certain RAT has a bottleneck in the downlink, the UE may take steps to improve mobile application performance.

Existing approaches for identifying bottlenecks in a downlink (such as SpeedTest) rely on measuring throughput. However, since low downlink throughput can be attributed to multiple factors, measuring cellular interface downlink throughput is not sufficient to identify bottlenecks. For example, low downlink throughput may be attributed to low offered application data rates, a condition that is not created by a RAT bottleneck.

Another prior art method of bottleneck determination utilizes active measurements for throughput estimation. Approaches relying on active measurements are limited as they cannot determine whether a bottleneck should be attributed to the radio access network (RAN) or to the core network. Also, approaches relying on active measurements impose additional overhead on the RAT, creating even more traffic on the downlink. Therefore, improvements in the field are desired.

SUMMARY OF THE INVENTION

Embodiments are presented herein of a system and method for operation of a user equipment (UE) to determine a cellular network bottleneck in a downlink channel, and an apparatus for use in a UE for determining the same. The UE may comprise at least one antenna, a radio operably coupled to the at least one antenna for communicating with a cellular network, a memory coupled to the radio and a processor operably coupled to the memory and the radio.

The UE may determine a burst of network traffic from network traffic received from the cellular network during a series of transmission time intervals. The UE may analyze resource allocations to the UE during the burst to determine an extent to which the cellular network is busy. The UE may then determine that the cellular network is experiencing a bottleneck based at least in part on the resource allocation analysis. In response to determining a bottleneck, the UE may take some action to attempt to address the bottleneck, such as transitioning from the current RAT to a different RAT.

The analysis may comprise determining a percentage of a plurality of transmission time intervals within the burst of network traffic that do no not have resources allocated to the UE (indicating that the base station was busy) and comparing the percentage to a first threshold. The analysis may further comprise determining a state of each of at least a subset of the plurality of transmission time intervals within the burst of network traffic.

In determining the state of each transmission time interval within the burst, the UE may calculate a percentage of the total number of resource blocks that were allocated to the UE from the base station during each transmission time interval. The UE may then determine the state of each transmission time interval in the burst based on the percentage. The UE may determine a number of transmission time intervals having an active state within the burst of network traffic, wherein an active state indicates that a high percentage of resource blocks in the transmission time interval are allocated to the UE. The UE may also determine a number of transmission time intervals in the burst having a busy state, wherein the busy state indicates that no resource blocks are allocated to the UE within the burst of network traffic. A busy state within a burst may indicate that the network is having to serve other UEs, and thus may indicate a bottleneck. The UE may then determine a percentage of transmission time intervals within the burst of network traffic having a busy state.

The UE may determine that a respective transmission time interval has a busy state when no resource blocks were received by the UE during the respective transmission time interval and the preceding transmission time interval has an active state. The UE may determine that the transmission time interval has an idle state when no resource blocks were received by the UE during the respective transmission time interval and the preceding transmission time interval does not have an active state, e.g., the preceding TTI was a last-active or idle state.

In performing the above method, the UE may compute an average extent to which the cellular network is busy over a plurality of bursts, and possibly over a plurality of time windows each containing a plurality of bursts. The UE may compare the average extent to which the cellular network is busy to the first threshold in determining whether a bottleneck exists.

The UE may also determine a duration of the burst by identifying a first active transmission time interval and a last active transmission time interval of the burst. In some embodiments, the UE may calculate an average duration value. The UE may determine that the cellular network is experiencing a bottleneck based at least in part on a determination that the duration of the burst of network traffic is greater than a first duration threshold. In some embodiments, the UE may determine that a bottleneck exists when the burst duration is greater than a second lower duration threshold and the extent to which the cellular network is busy is greater than a "busy" threshold. The UE may determine the first active transmission time interval (TTI) as one having an active state immediately preceded by an empty TTI, and may determine the last active TTI as one having a nonzero percentage of resource blocks containing data for the UE that is less than a high threshold.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
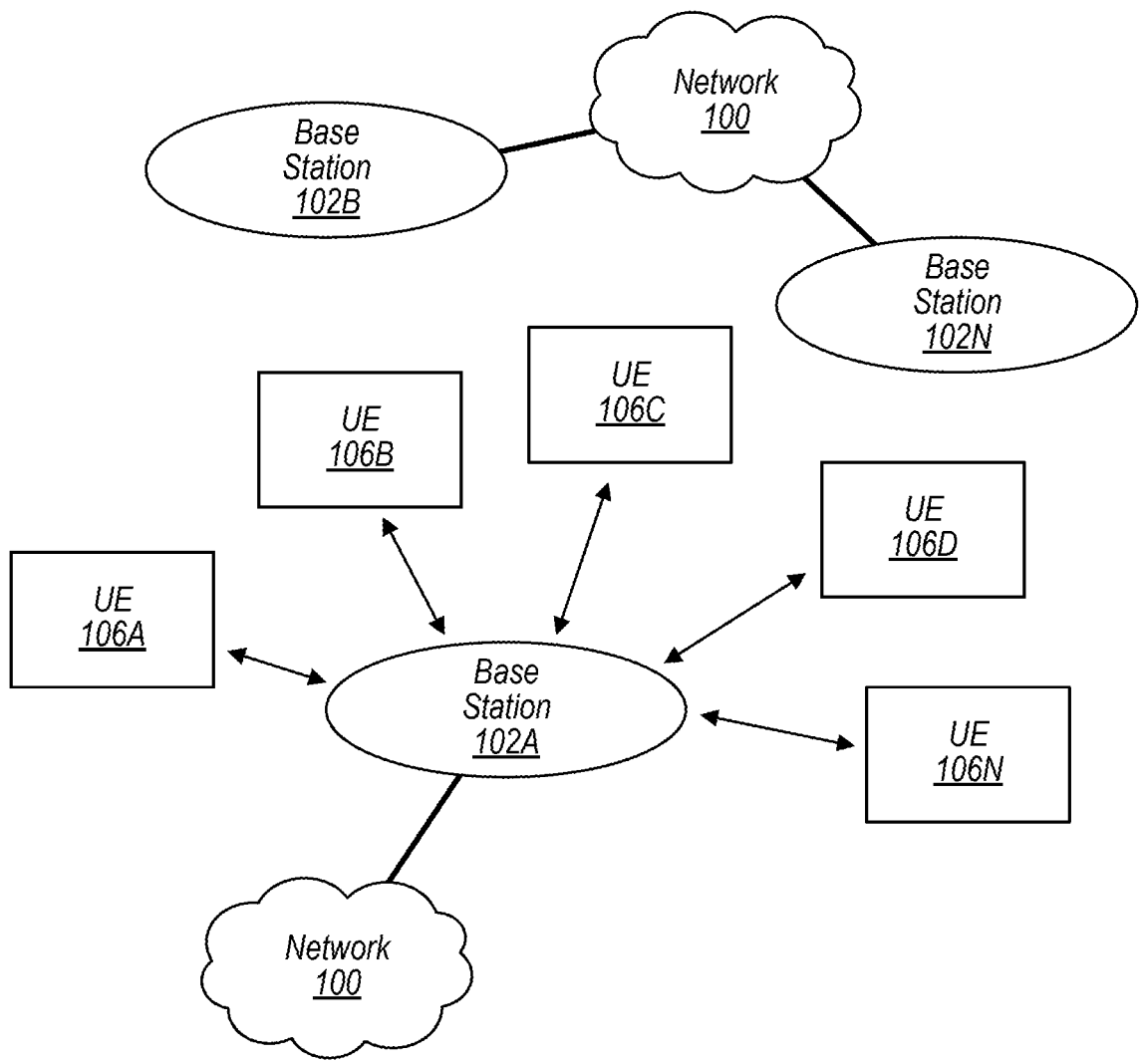
FIG. 1 illustrates an example (and simplified) wireless communication system according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Various acronyms are used throughout the present disclosure. Definitions of the most prominently used acronyms that may appear throughout the present disclosure are provided below:

UE: User Equipment
RF: Radio Frequency
BS: Base Station
NW: Network
DL: Downlink
UL: Uplink
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
RAN: Radio Access Network
FDMA: Frequency Division Multiple Access
IE: Information Element
NF: Network Function
PUSCH: Physical Uplink Shared Channel
PDCCH: Physical Downlink Control Channel
RRC: Radio Resource Control Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™ Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, unmanned aerial vehicles (UAVs), unmanned aerial controllers (UACs), vehicles, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Bottleneck—A network bottleneck is a point where the application data rate cannot be accommodated by the wireless network. A bottleneck may occur when the network has so many requests from a plurality of UEs that the network is unable to provide one or more of the UEs with the attention they need or desire. A bottleneck may also occur when the performance of the wireless link is poor due to low signal strength or interference. As one example, a network "bottleneck" may be a point of traffic congestion on the network.

Burst—a continuous transfer of data, that may or may not have an interruption, from one device to another.

Transmission Time Interval (TTI)—The term "transmission time interval" has the full extent of its ordinary meaning, and at least includes a time unit for the base station (BS) to schedule uplink (UL) and downlink (DL) data transmissions.

Radio Access Network (RAN)—A radio access network is part of a telecommunications system that connects individual devices to other parts of a network through radio connections. A RAN resides between user equipment such as a mobile phone, a computer or any remotely controlled machine, and provides the connection with its core network. Examples of radio access networks include Bluetooth Wi-Fi, GSM, UMTS, 4G LTE and 5G NR network connections.

Radio Access Technology (RAT)—A radio access technology is the underlying physical connection method for a radio access network. Many modern mobile phones support several RATs in one device such as Bluetooth, Wi-Fi, and GSM, UMTS, 4G LTE, Of 5G NR.

Uplink (UL)—in cellular communications an uplink is a transmission path from a User Equipment (UE) to a base station (BS).

Downlink (DL)—in cellular communications, a downlink is a transmission path from a base station (BS) to a User Equipment (UE).

Contention—is a condition that occurs when two or more mobile devices or UEs are contending for the same network resources.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
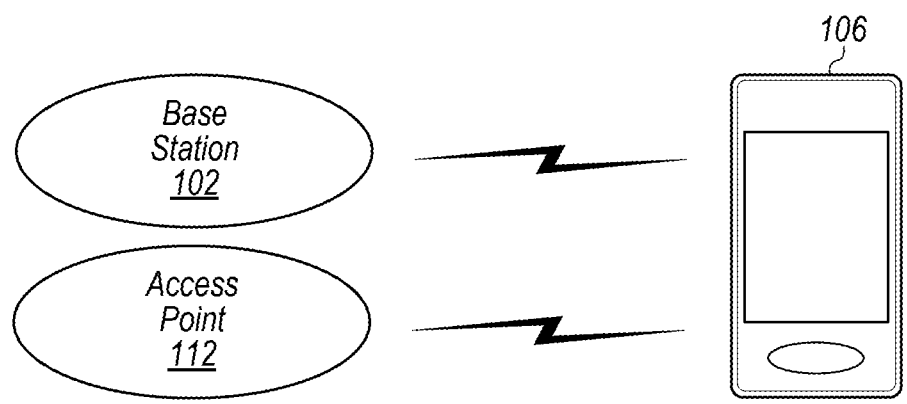
FIG. 2 illustrates an example of a base station (base station) and an access point in communication with a user equipment (UE) device according to some embodiments.

FIGS. 1 and 2—Example Communication System

FIG. 1 illustrates a simplified example wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'.

The communication area (or coverage area) of the base station may be referred to as a "cell." The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. In particular, the cellular base station 102A may provide UEs 106 with various telecommunication capabilities, such as voice, SMS and/or data services.

As also used herein, from the perspective of UEs, a base station may sometimes be considered as representing the network as far as uplink and downlink communications of the UE are concerned. Thus, a UE communicating with one or more base stations in the network may also be interpreted as the UE communicating with the network.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment (UE) 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device as defined above.

The UE 106 may include a processor (processing element) that is configured to execute program instructions stored in memory. The UE 106 may perform any of the operations described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the embodiments described herein, or any portion of any of the embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

In a similar manner, the base station 102 may include a processor (processing element) that is configured to execute program instructions stored in memory. The base station 102 may perform any of the operations described herein by executing such stored instructions. Alternatively, or in addition, the base station 102 may include a programmable hardware element such as an FPGA (field-programmable gate array), an integrated circuit, and/or any of various other possible hardware components that are configured to perform (e.g., individually or in combination) any of the embodiments described herein, or any portion of any of the embodiments described herein.

Figure 3:
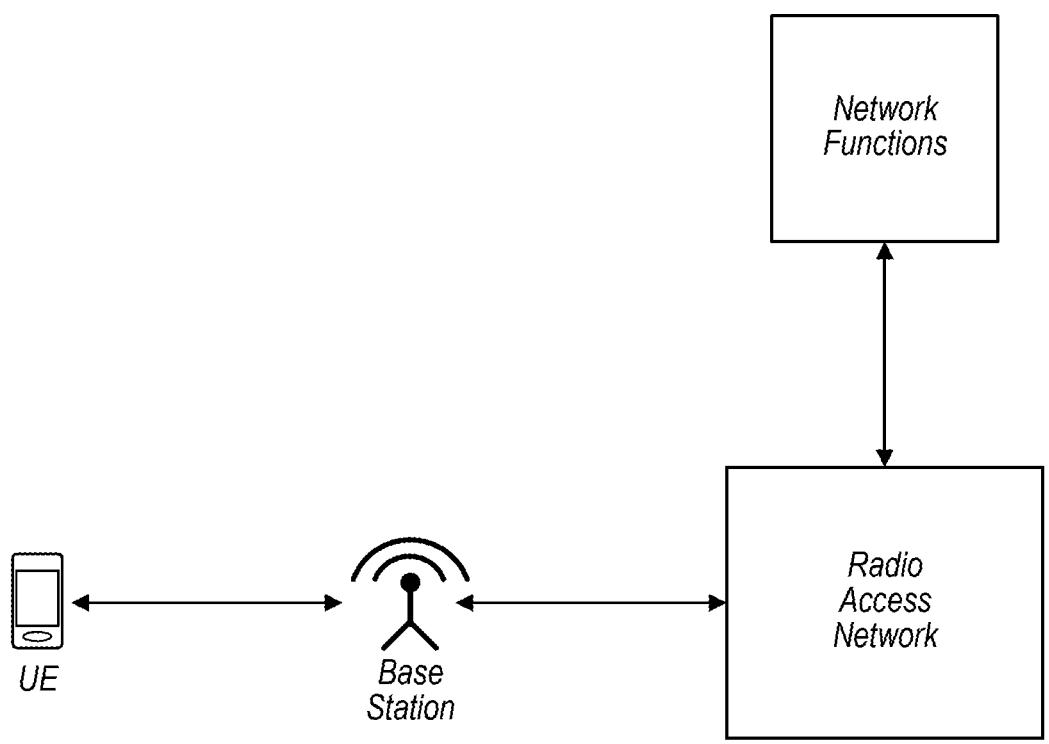
FIG. 3 is a block diagram of a cellular network system, according to some embodiments.

FIG. 3—Example Cellular Network

FIG. 3 is a block diagram illustrating an example cellular network, according to some embodiments. As shown, the UE communicates in a wireless fashion with a base station, which may as one example be referred to as gNB. The base station in turn communicates to a cellular network.

FIG. 3 illustrates a simplified view of a cellular network, showing various elements which may be relevant to operations described herein. As shown, the base station may couple to a Radio Access Network (RAN). The RAN may in turn couple to various network elements or network functions, e.g., one or more computer systems which implement various network functions. For example, the Radio Access Network may couple to a User Plane Function (UPF) which in turn may be coupled to various additional network functions.

Typically, Network Functions may be implemented as software executing on a computer system, such as a server, e.g., a cloud server. Network functions which may be present in the cellular network system may include functions such as an Access and Mobility Management Function (AMF), a Policy Control Function (PCF), a Network Data Analytics Function (NWDAF), an Application Function (AF), a Network Slice Selection Function (NSSF), and a UE radio Capability Management Function (UCMF), among numerous possible others.

Figure 4:
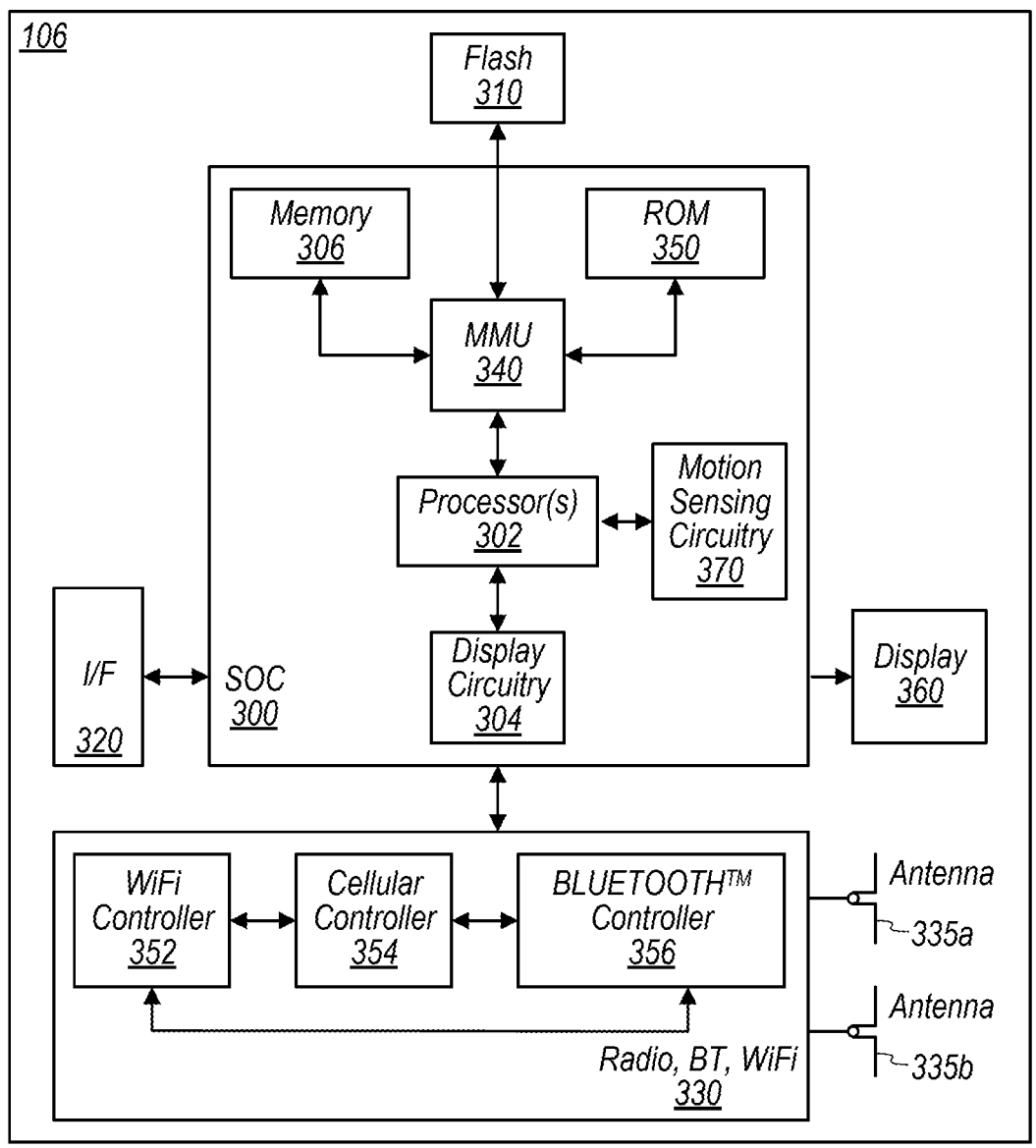
FIG. 4 illustrates an example block diagram of a UE, according to one embodiment.

FIG. 4—Block Diagram of an Example UE Device

FIG. 4 illustrates a block diagram of an example UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

In some embodiments, radio 330 may include separate controllers dedicated to controlling communications for various respective RAT standards. For example, as shown in FIG. 4, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Figure 5:
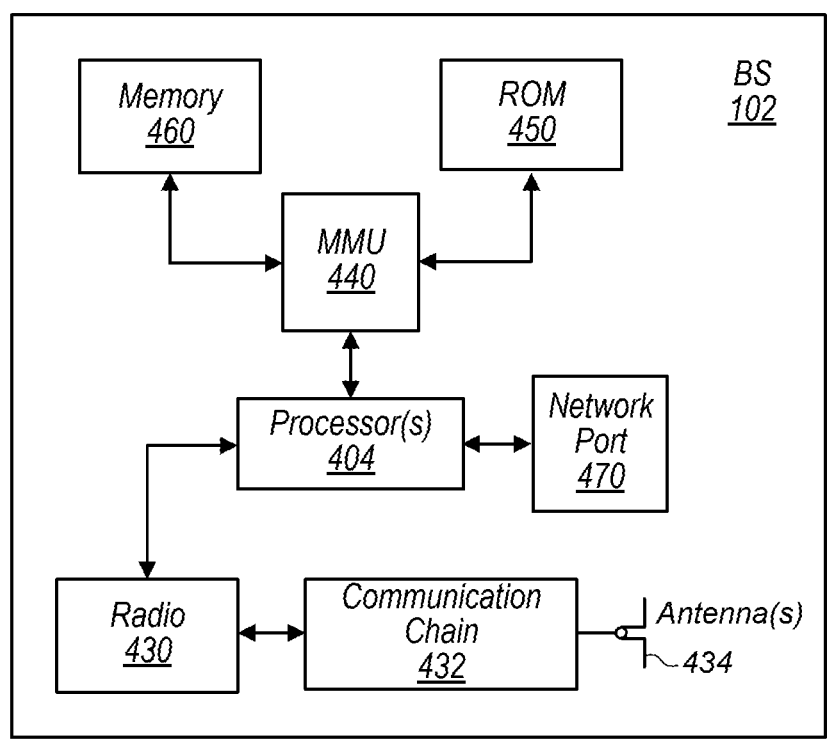
FIG. 5 illustrates an example block diagram of a base station, according to one embodiment.

FIG. 5—Block Diagram of an Example Base Station

FIG. 5 illustrates a block diagram of an example base station 102, according to some embodiments. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Bottleneck Determination

A network bottleneck may be characterized as a point of traffic congestion on the network. A network may have so many requests from various UEs that the network is unable to provide the one or more other UEs with the attention they need or desire. In such a situation, a bottleneck may occur in a downlink between a base station and a UE. The bottleneck may result in slow communication speeds, poor application performance and may limit user efficiency and productivity on a network.

If a UE can determine a bottleneck in a downlink (from a base station to a UE), it may have the opportunity to take action to mitigate the effects to the UE. For example, upon determination of a bottleneck in a downlink, a UE may choose to adjust the execution of one or more applications, alert the network and/or the user, or switch to another RAT.

Described herein is system and method for identifying cellular network bottlenecks by leveraging base station scheduling patterns. The base station scheduling patterns may be used to first identify traffic bursts and then to analyze these traffic bursts to determine cellular network bottlenecks. In other words, embodiments described herein may operate to analyze resource allocations to the UE in received transmission time intervals (TTIs) to determine (or attempt to assess) an extent to which the cellular network is busy, and thus whether a bottleneck has occurred.

Figure 6:
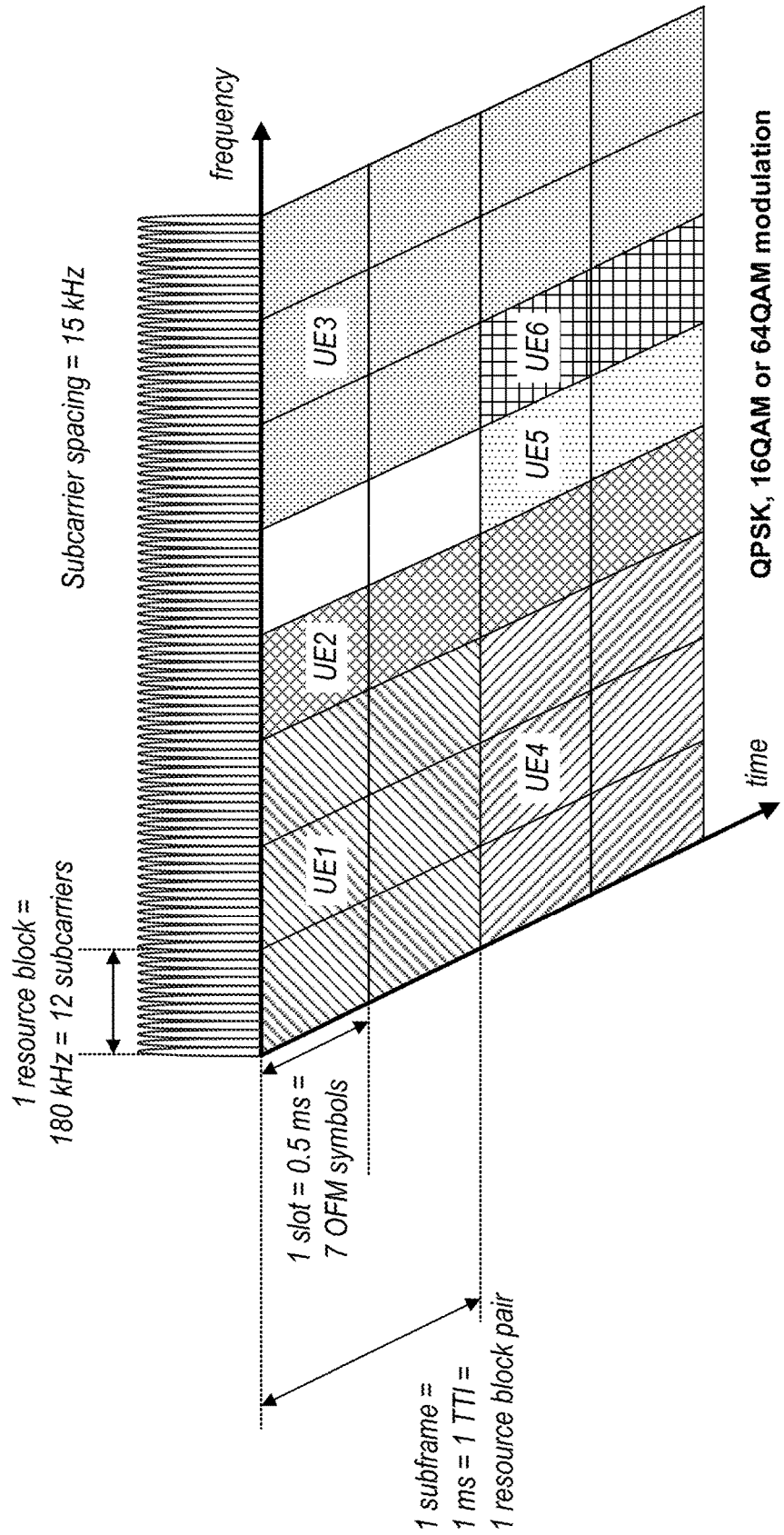
FIG. 6 illustrates an example of downlink data transmission in LTE.

FIG. 6—Downlink Data Transmission

FIG. 6 illustrates downlink data transmission using LTE as an example. A resource block (RB) is the smallest unit of resources that can be allocated to a UE by a base station. A cellular base station may use a centralized proportional fair scheduler which assigns RBs to UEs at each scheduling interval. A scheduling interval, in this context, may also be known as a transmission time interval (TTI). For example, in LTE, an RB is specified in time (7 OFDM symbols) and in frequency (12 subcarriers) dimensions and a TTI is 1 ms. For a 20 MHz channel, there are 100 RBs in one TTI.

A burst has been traditionally defined as a continuous transfer of data that ideally is without interruption (but which may have some interruption) from one device to another. A base station prefers to send data to each UE in bursts, i.e., to assign all of the RBs in one TTI to one UE. There are a number of reasons for this behavior. For example, bursting saves spectrum by reducing control channel overhead. Also, bursting improves a UE's battery life by increasing the time a UE's radio can enter low-power mode. Hence, in each TTI, a base station will assign a small fraction of the total RBs to a target UE only if there is no more buffered data for the target UE, implying the end of a burst. Therefore, embodiments described herein may enable a UE to determine the beginning and end of a burst through the observation of a base station's RB assignment pattern.

As used herein, the term "burst" is used to refer to traditional bursts as defined above (a continuous transfer of largely uninterrupted data), as well as partially continuous transfers of data which in fact were interrupted by the network due to a bottleneck, a measurement gap, or some other reason. In other words, the term "burst" as used herein refers to a group of data that is received by the UE in two or more consecutive transfer intervals, which may or may not have been in fact interrupted with empty TTIs due to a bottleneck or some other issue.

Embodiments described herein characterize "states" of a TTI based on the amount of RBs allocated to a UE during a TTI. These states may be used by a UE to determine whether a cellular network (or base station) was busy during one or more bursts of network traffic and hence to identify bottlenecks in a downlink between a base station and a UE.

Figure 7:
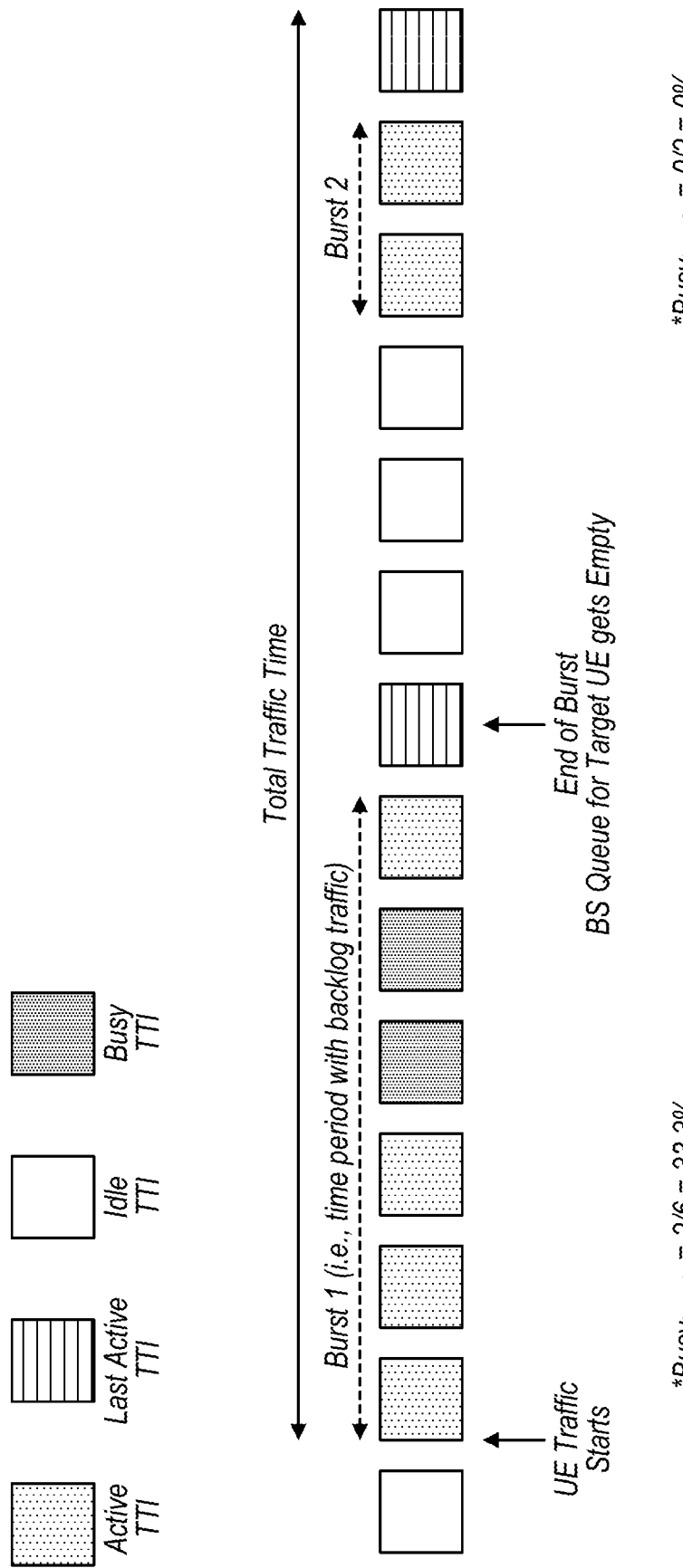
FIG. 7 illustrates various TTI states in accordance with embodiments described herein.

FIG. 7—TTI States Used in Burst Detection Methods

FIG. 7 illustrates TTI states used in burst determination methods in accordance with some embodiments described herein. Four TTI states are defined: Active TTI, Last-active TTI, Idle TTI and Busy TTI.

An Active TTI may be defined as a TTI wherein the percentage of RBs allocated to a UE is greater than a high threshold, such as 75%. In an Active TTI, a large percentage of the resource blocks of the TTI are allocated to the UE, and hence this TTI is presumed to be part of a burst of download network traffic from the network (base station) to the UE.

A Last-active TTI may be defined as a TTI wherein the percentage of RBs allocated to a UE is less than the high threshold, such as 75%, and is nonzero (greater than 0%). In a Last-active TTI, a smaller percentage of resource blocks are allocated to the UE, and hence this TTI is presumed to indicate the end of the burst. This is based on the notion that at the end of the burst the "leftover" or "last remaining" data is being transmitted, which will typically not be a full amount of resource blocks, but rather will typically be a smaller percentage (except in a few outlier cases).

A Busy TTI may be defined as a TTI wherein the percentage of RBs allocated to a UE is zero or 0% (i.e., where the UE is not scheduled during the TTI) and where the previous TTI is an Active TTI. In the case of a Busy TTI, no resource blocks are allocated to the UE in the TTI, and this TTI follows an Active TTI (not a Last-active TTI), meaning that this TTI is presumed to be within a continuous burst (since the Last-active TTI has not yet been received).

An Idle TTI may be defined as a TTI wherein the percentage of RBs allocated to the TTI is 0% (i.e., wherein the UE is not scheduled during the TTI) and wherein the previous TTI is a Last-Active TTI or an Idle TTI. In the case of an Idle TTI, no resource blocks are allocated to the UE in the TTI, and this TTI follows a Last-active TTI (not an Active TTI), meaning that this TTI is presumed to be at the end of a continuous burst, e.g., may be between bursts when the base station is transmitting data to other UEs.

FIG. 7 shows examples of two determined bursts, Burst 1 and Burst 2. As shown, a burst may be determined as beginning with a transmission time interval (TTI) that is identified as a first Active TTI (an Active TTI preceded by an Idle TTI) and ending with an identified last Active TTI (Last-active TTI). Burst 1 comprises six TTIs, four of which are Active TTIs and two of which are Busy TTIs. Burst 2 comprises two TTIs, both of which are Active TTIs (and with no Busy TTIs). In the example of FIG. 7, the bursts are measured such that they do not include the associated Last-active TTI. Alternatively, a burst may be measured such that it does include the associated Last-active TTI.

A base station may be determined to have a busy percentage that is equal to the number of Busy TTIs during a burst divided by the total number of TTIs in the burst. Consistent with this definition, Burst 1 may be described as having a busy percentage of 33.3%, wherein 2 TTIs are identified as Busy and 4 TTIs are identified as Active, yielding a ratio of 2 divided by 6 or 33.3%. Alternatively, the Last-active TTI may also be counted as part of the burst, and thus the ratio would be 2 divided by 7 or 28.5%.

Burst 2 may be described as having a busy percentage of 0% since it does not have any Busy TTIs.

Bottlenecks in a downlink may result from various scenarios, such as the application data rate being greater than the RAT throughput, the presence of high contention between UEs receiving network traffic from the same base station, etc. The first scenario may result in bursts of high duration, for example, bursts having durations that are greater than 2 seconds. The second scenario may result in bursts of significant duration that also have a high busy percentage, for example, bursts having durations greater than or equal to 40 milliseconds and busy percentages greater than 50%. Embodiments described herein may operate to determine a bottleneck in a downlink by identifying the aforementioned conditions.

Figure 8:
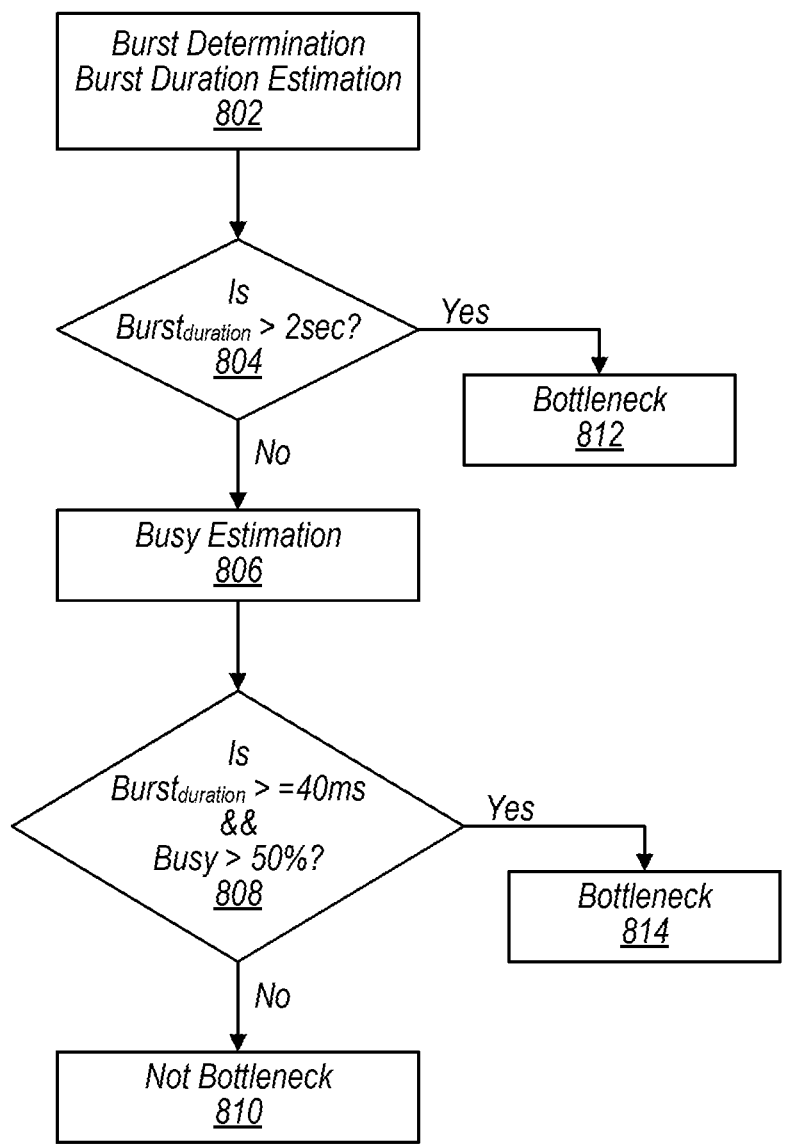
FIG. 8 illustrates a flowchart for an example bottleneck determination method in accordance with embodiments described herein.

FIG. 8—Bottleneck Determination Method Flowchart

FIG. 8 illustrates a bottleneck determination method flowchart in accordance with some embodiments described herein. The method of FIG. 8 may be performed by a UE, e.g., may be performed by each of a plurality of UEs served by a cellular network. As previously described, the method may analyze resource allocations in received TTIs to determine whether a bottleneck likely exists.

At 802, the method may determine a burst and may estimate the duration of the burst. As explained above, a burst may be determined as beginning with a transmission time interval (TTI) that is first identified as an Active TTI (an Active TTI preceded by an Idle TTI) and ending with an identified last Active TTI (Last-active TTI). The duration of a burst may include all of the transmission time intervals within the burst, excepting the Last-active TTI. In an Active TTI, more than a high threshold (e.g. 75%) of RBs are allocated to the UE. In Last-active TTI, between 0% and a high threshold (e.g. 75%) of RBs are allocated to the UE.

After identifying the burst and determining the duration of the burst, at 804 the method may determine whether the length of a burst is greater than a burst-duration threshold (e.g. 2 seconds). A burst of "long" duration (exceeding a "burst-duration threshold") indicates that a considerable amount of time was required by the base station to transmit requested data to a UE. A long burst may imply that the base station's data buffers are full, i.e. that there is a "backlog" of UE application data at the base station. This backlog may suggest that the UE's application data rates are greater than the throughput of the RAT downlink channel, resulting in a bottleneck. The burst-duration threshold may be any of various values. In this example, the burst-duration threshold is 2 seconds. However other threshold values may be used to indicate a "long" burst, e.g., any value in the range of 1 second or higher.

If the UE determines that the burst exceeds the burst-duration threshold, the UE determines a bottleneck at 812, and operation completes, e.g., returns to 802 for monitoring of newly received bursts. If the length of the burst is less than the burst-duration threshold, the method proceeds to 806.

At 806, the method may estimate the busy percentage of the burst. As explained above, a base station may be determined to have a busy percentage that is equal to the number of Busy TTIs during a burst divided by the total number of TTIs in the burst. A Busy TTI immediately follows an Active TTI and comprises zero RBs allocated to the UE.

The presence of Busy TTIs within a burst may indicate that during the time the base station was in the process of sending data to the UE, (as indicated by the Active TTIs in the burst), the cellular network (the base station) was required to transmit data to one or more other UEs (as indicated by the Busy TTIs during the burst). As a result, the base station interrupted its service to the UE in order to attend to these conflicting demands. This situation, where one or more UEs are competing for scarce resources, is known as "contention" between UEs.

Therefore, calculating a busy percentage of a burst may lead to an indication of a bottleneck. A busy percentage may be calculated by dividing the total number of Busy TTIs during a burst by the total number of Active TTIs during the burst. The UE may perform other methods or procedures to determine the extent to which the network is busy.

A burst of moderate duration (greater than a medium-duration threshold, e.g. 40 milliseconds, but less than a "long" burst-duration threshold, e.g. 2 seconds) may not be long enough by itself to imply that there is a backlog of data at the base station, which may indicate a bottleneck. However, in this embodiment, a burst of at least moderate duration or longer and also having a significant busy percentage may indicate contention, and therefore a bottleneck.

At 808, the method may determine whether the burst is greater than a medium-duration threshold (e.g. 40 milliseconds) and whether the burst has a busy percentage greater than a certain percentage, such as 50%. Any of various busy percentage thresholds may be used in determining whether the cellular network is busy, such as a busy threshold percentage ranging from 40% or higher.

If the answers to both determinations are yes, at 814, the method may determine a bottleneck. If the answer to one of the determinations is no, at 810, the method may determine that there is not a bottleneck. In this case, the method may return to 802 and begin assessing a new burst.

The flowchart of FIG. 8 may be performed repetitively or continuously to continually assess whether a bottleneck exists in the network. In some embodiments, the method of FIG. 8 may be disabled or turned off during periods, or in geographic areas, when a bottleneck is unlikely to occur. In some embodiments, a UE may share its bottleneck determination with other neighboring UEs.

In response to detection of a bottleneck, the UE may operate to switch to using a different RAT. For example, the UE may be operating on an LTE network when it detects a bottleneck using the method described above. The UE may be operating on an LTE network since it may have less power requirements, or possibly more available bandwidth, than a more modern RAT, such as NR. A bottleneck identified on the LTE network may indicate that the speed of the LTE network cannot accommodate the application data rate of an application executing on the UE (such as a game). A bottleneck identified on the LTE network may also, or instead, indicate that two many UEs are vying for attention of the base station (the network). Note that method described herein may identify bottlenecks using only passive measurements, i.e., using only data that is already being sent to the UE. Further, the method may make no assumptions about the application data rate or core network performance.

In response to detecting a bottleneck on the LTE network, the UE may transition to a different RAT, such as a 5G RAT (New Radio or NR) which presumably has less network congestion. It is noted that the UE may transition back to the LTE network later based on various criteria.

The embodiments described herein may be used in various use cases. For example, the method may be used in a "Smart Data Mode", wherein upon detecting a bottleneck the UE can enable its 5G interface (transition from using LTE to using NR) to improve cellular performance. The method may also be used in a Low Power Mode, where the method allows the UE to operate using an LTE RAT to save energy, and switch to a different RAT, such as 5G, only when it is necessary. The method may also be used in Smart SIM selection. The method may allow for smart SIM selection upon identifying RAT bottlenecks in a certain SIM.

Figure 9:
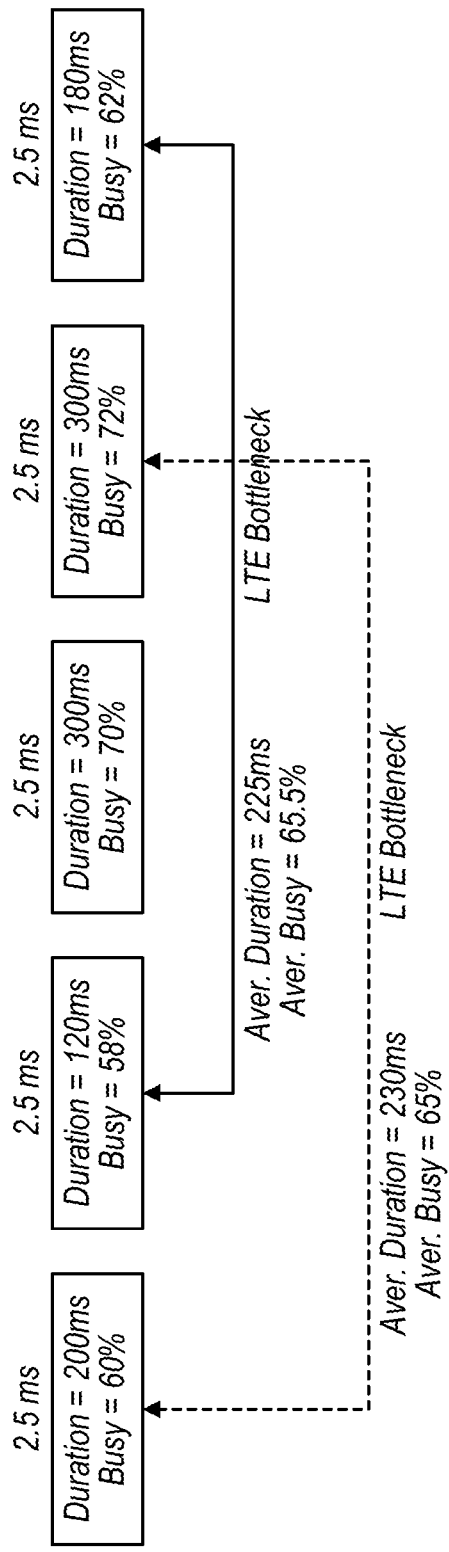
FIG. 9 illustrates a second example bottleneck determination method in accordance with embodiments described herein.

FIG. 9—Bottleneck Determination Over Multiple Time Windows

Infrequently, a burst of network traffic may be of a size that completely fills an integer number of TTIs fairly precisely. In such a case, the burst of network traffic would be indicated by an integer number of Active TTIs only, i.e., there may not be a "leftover" or "last remaining" amount of data that takes up only a fraction of the last TTI of the burst. In this case, the method may not be able to identify a Last-active TTI associated with the end of the burst. In order to ensure burst determination (and subsequent bottleneck determination) in such a situation, the bottleneck detection method may calculate an average burst duration and average busy percentage (contention) over multiple time periods. An example of such an averaging method is shown in FIG. 9.

FIG. 9 illustrates five consecutive time period windows, each having a duration of 2.5 seconds. One or more bursts (typically a plurality of bursts) may be determined within each time period. The average of both the duration and the busy percentage of the bursts within each time period may be indicated within each corresponding time period window. A moving average of burst duration and busy percentage may be calculated for each of the two sets of four consecutive time windows. In these examples, both moving averages determine a bottleneck, which is consistent with the parameters of each individual time window.

The approach of FIG. 9 may be particularly useful in situations where a burst of network traffic fills an integer number of TTIs precisely and is therefore not detected by the bottleneck method described in FIG. 8. In such situations, a bottleneck detection method involving averaging over time windows may result in more accurate detection of the burst and/or more accurate estimation of the extent to which the network is busy.

The duration of each time window may be 2.5 seconds, as indicated by the example of FIG. 9. However, the duration of each time window may be of any desired length, ad is preferably longer than the burst-duration threshold (e.g. 2 seconds). Likewise, it should be noted that the moving average calculation need not be restricted to four time windows. Rather, the number of time windows used to calculate the moving average may vary in accordance with the properties of the system being analyzed.

Figure 10:
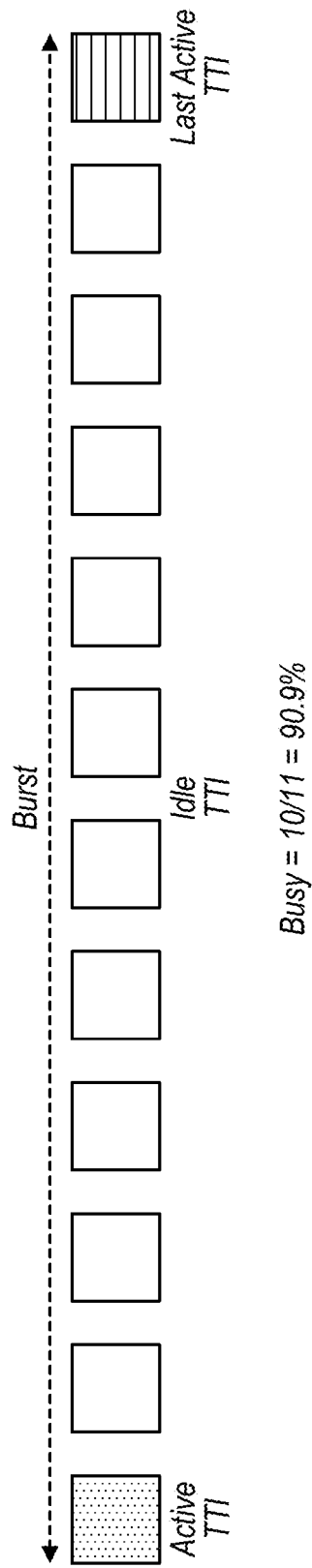
FIG. 10 illustrates an example short burst interrupted by a measurement gap in accordance with embodiments described herein.

FIG. 10—Short Bursts

Sometimes bursts are received by a UE which are of less than a moderate duration (e.g. 40 milliseconds or less). Since short bursts indicate sparse traffic, certain embodiments do not consider short bursts to be indicative of a bottleneck. Since busy estimation of short bursts may be unreliable, certain embodiments do not consider whether these short bursts have a busy percentage.

Busy estimation for short bursts may be unreliable because Idle TTIs resulting from measurement gaps may be mistaken for busy TTIs. FIG. 10 illustrates an example of such a scenario. FIG. 10 shows a short burst of 11 milliseconds (1 TTI=1 millisecond), interrupted by a measurement gap (represented by ten Idle TTIs) of 10 milliseconds. Embodiments contained herein may consider a short burst to be of a duration between 0 ms and 40 ms. However, this threshold may vary depending on the duration and periodicity of measurement gaps in the RAT under analysis.

FIGS. 11-16—Example Operation

Figure 11:
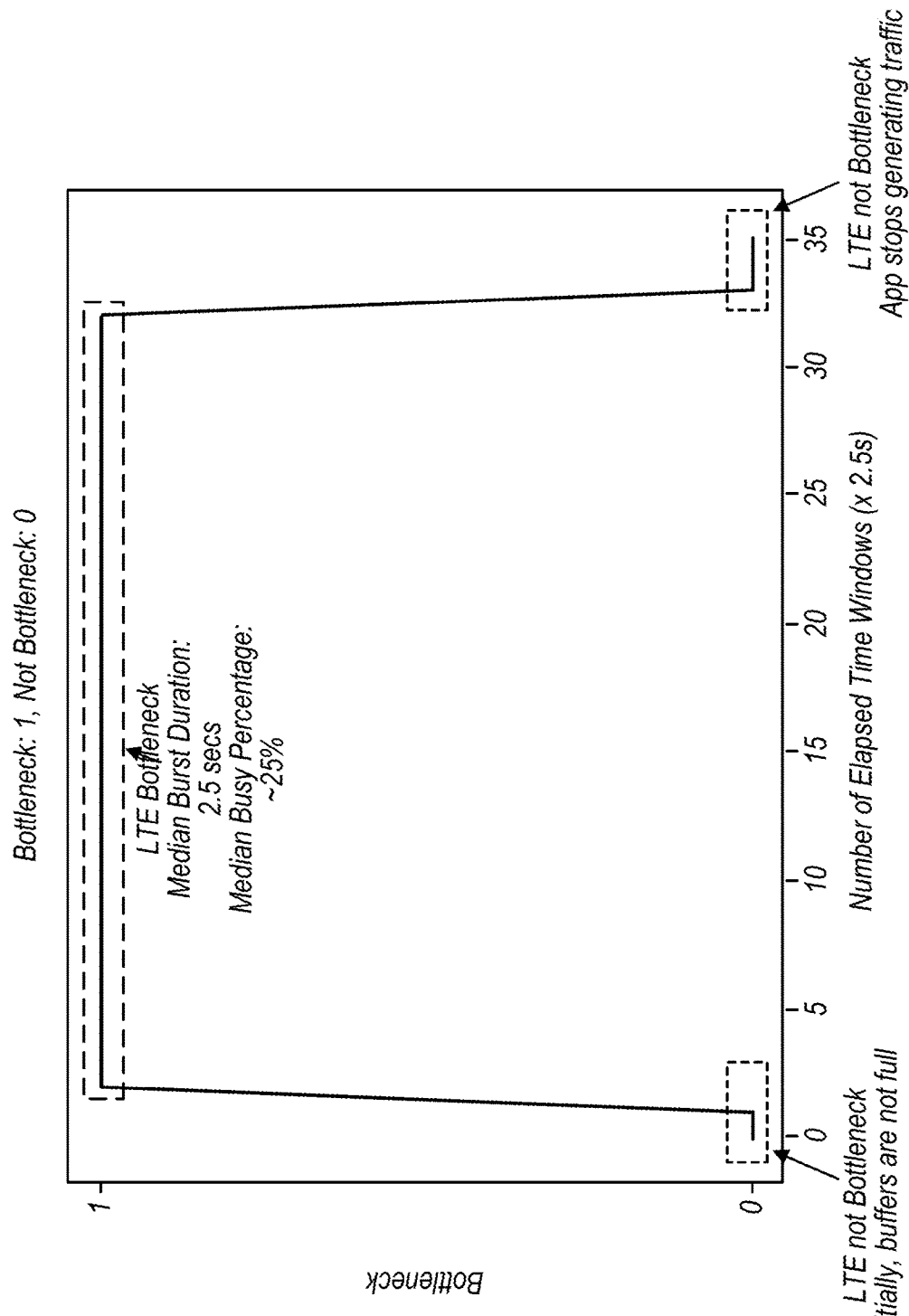
FIG. 11 is a graph illustrating a determination of a bottleneck in accordance with embodiments described herein.

FIG. 11 shows an example of the detection of a bottleneck by the method described herein. The graph of FIG. 11 represents the results of an experiment involving a downlink file transfer protocol (FTP) to a UE of 222.65 Mbps. The RAT throughput was <200 Mbps and there was no contention from other UEs. The method determined a median burst duration of 2.5 seconds and a median busy percentage of about 25%. The method therefore determined a bottleneck resulting from high application data rates (burst>2 s) and no contention (Busy percentage<50%). The existence of a bottleneck during this time period is confirmed by the presence and absence of application data in the data buffers of the UE under test.

Figure 12:
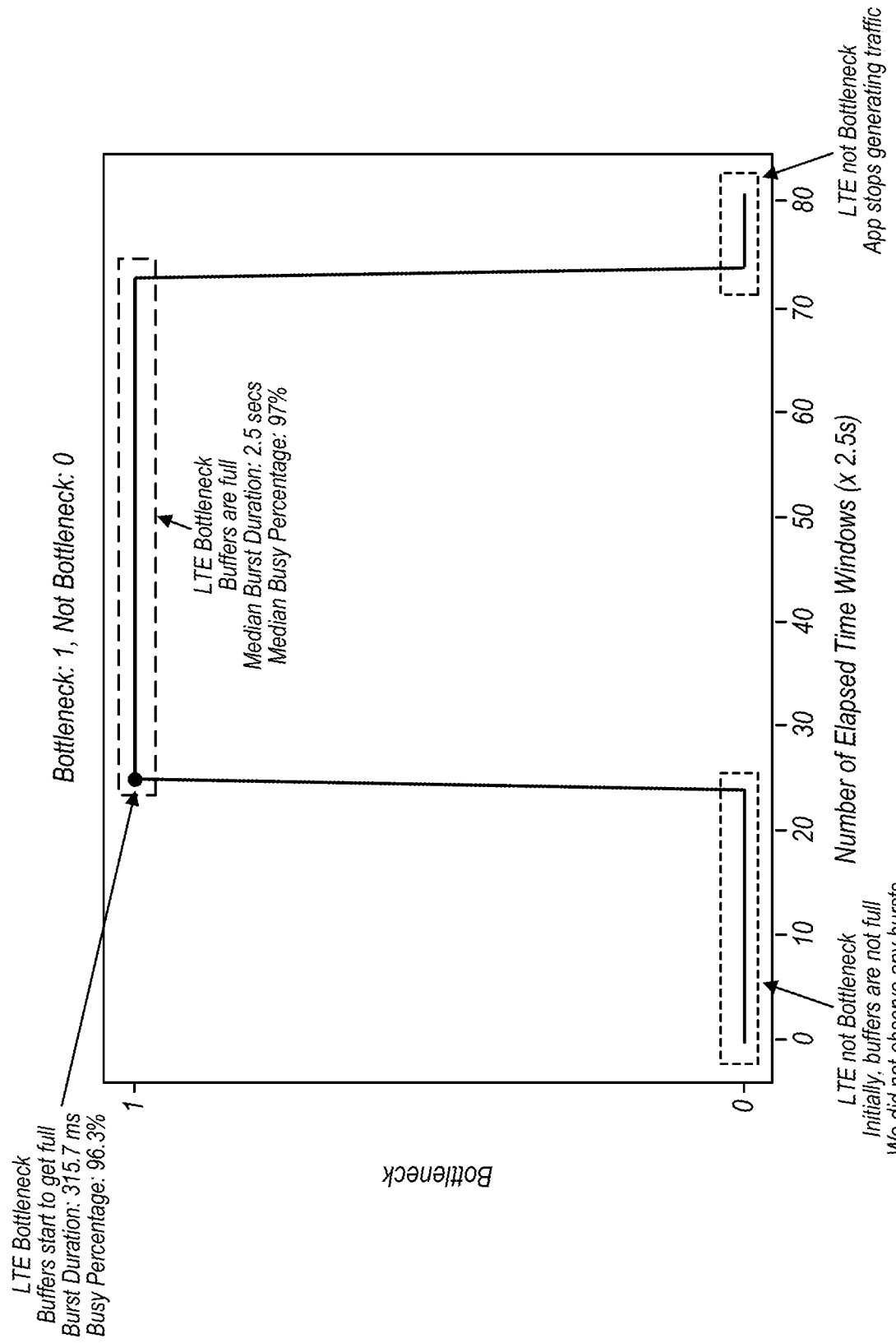
FIG. 12 is a graph illustrating a determination of a bottleneck in accordance with embodiments described herein.

FIG. 12 shows an example of the determination of a bottleneck by an embodiment of the method. The graph of FIG. 12 represents the results of an experiment involving a downlink file transfer protocol (FTP) to a UE of 222.65 Mbps. The RAT throughput was <200 Mbps and there was contention from a total of 18 UEs. As indicated by the graph, the method first determines a bottleneck by determining a burst duration of 315.7 ms having a busy percentage of 96.3%. A bottleneck continues to be determined over a period of about fifty time windows (2.5 s per time window), during which time the median burst duration is 2.5 seconds and the median busy duration is 97%.

Figure 13:
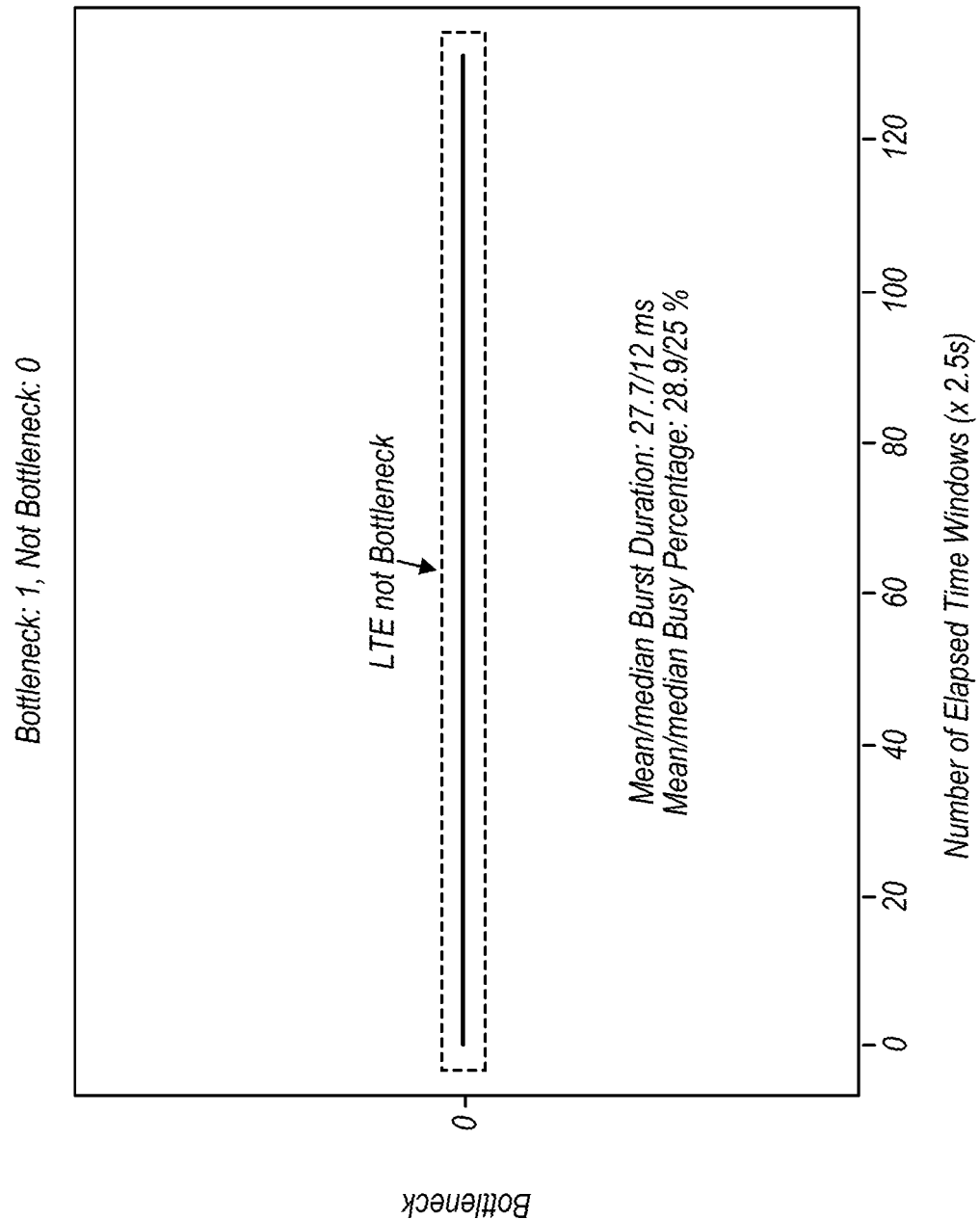
FIG. 13 is a graph illustrating determination of "no bottleneck" in accordance with embodiments described herein.

FIG. 13 shows an example of the determination of the absence of a bottleneck by the method described herein. The graph of FIG. 13 represents the results of an experiment involving downlink video streaming to a UE at an average rate of 20.3 Mbps, a rate much lower than the RAT throughput. There was no contention from other UEs. As indicated by the graph, the method determined a mean burst duration of 27.7 ms and a median burst duration of 12 ms. The method determined a mean busy percentage of 28.9% and a median busy duration of 25%. Accordingly, the method determined "no bottleneck" for the system under test.

Figure 14:
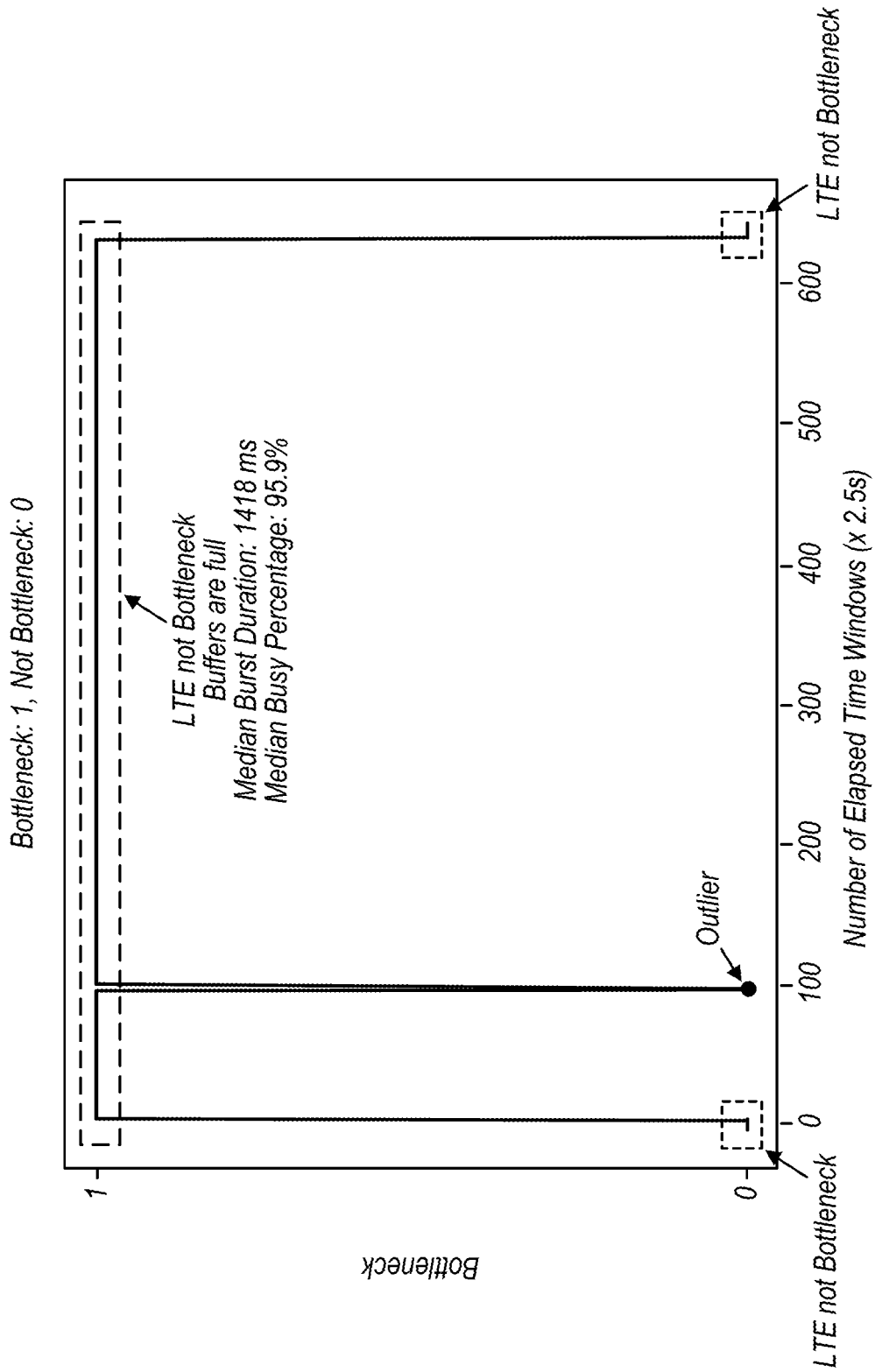
FIG. 14 is a graph illustrating determination of a bottleneck in accordance with embodiments described herein.

FIG. 14 shows an example of the determination of a bottleneck by the method described herein. The graph of FIG. 14 represents the results of an experiment under the same conditions as those of FIG. 13, (a downlink video streaming to a UE at an average rate of 20.3 Mbps, a rate much lower than the RAT throughput), with the addition of contention by 11 other UEs. As indicated by the graph, the method determined a median burst duration of 1418 ms and a median busy duration of 95.9%. Through the use of a moving average calculation such as that described with reference to FIG. 9, the method determined a bottleneck for the system under test in spite of the outlier at x=100.

Figure 15:
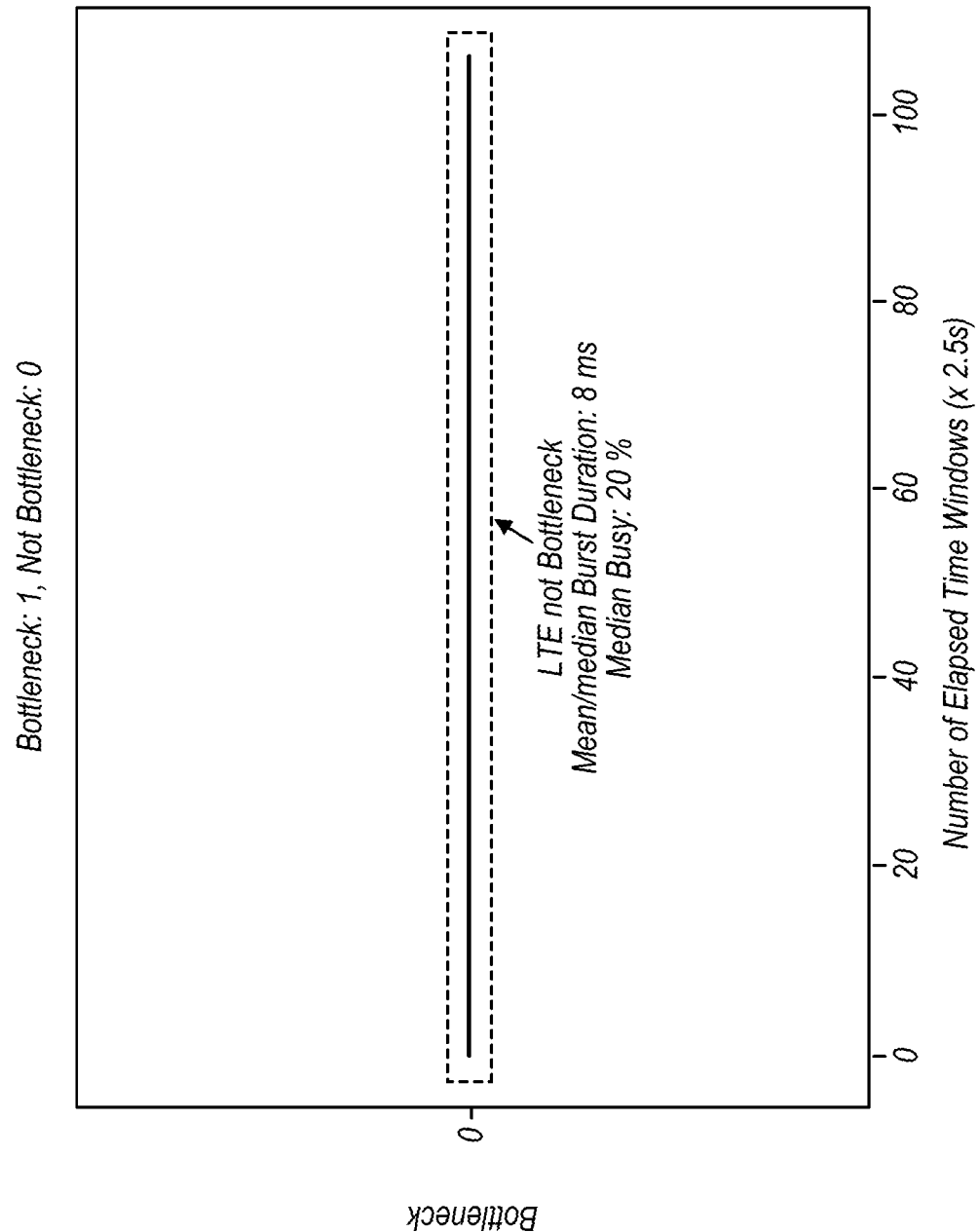
FIG. 15 is a graph illustrating determination of "no bottleneck" in accordance with embodiments described herein.

FIG. 15 shows an example of the determination of the absence of a bottleneck by the method described herein. The graph of FIG. 15 represents the results of an experiment involving downlink video streaming to a UE at an average rate of 1.1 Mbps, a rate much lower than the RAT throughput. There was no contention from other UEs. As indicated by the graph, the method determined a mean and median burst duration of 8 ms and a median busy duration of 20%. Accordingly, the method determined "no bottleneck" for the system under test.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A user equipment (UE), comprising:
at least one antenna;
a radio operably coupled to the at least one antenna for communicating with a cellular network;
a memory coupled to the radio; and
a processor operably coupled to the memory and the radio;
wherein the UE is configured to:
receive network traffic from the cellular network during a series of transmission time intervals;
determine a burst of network traffic from the received network traffic, wherein the burst of network traffic comprises a plurality of transmission time intervals;
determine a duration of the burst by determining a first active transmission time interval of the burst and a last active transmission time interval of the burst, wherein the UE is configured to determine the first active transmission time interval as a first transmission time interval having an active state immediately preceded by an empty transmission time interval, and wherein the UE is configured to determine the last active transmission time interval as a second transmission time interval having a nonzero percentage of resource blocks containing data for the UE that is less than a first threshold;
analyze resource allocations to the UE in the plurality of transmission time intervals to determine an extent to which the cellular network is busy; and
determine that the cellular network is experiencing a bottleneck based at least in part on the analysis of the resource allocations to the UE in the plurality of transmission time intervals, a determination that the duration of the burst of network traffic is greater than a second threshold, and that the extent to which the cellular network is busy is greater than a third threshold.

2. The UE of claim 1,
wherein, in analyzing the resource allocations to the UE in the plurality of transmission time intervals, the UE is configured to:
determine a percentage of transmission time intervals within the burst of network traffic that do not have resources allocated to the UE; and
compare the percentage to a fourth threshold;
wherein the UE is configured to determine that the cellular network is experiencing the bottleneck further based at least in part on the percentage exceeding the fourth threshold.

3. The UE of claim 2,
wherein the UE is configured to determine an average extent to which the cellular network is busy over a plurality of bursts;
wherein the UE is configured to compare the average extent to which the cellular network is busy to the fourth threshold; and
wherein the UE is further configured to determine that the cellular network is experiencing the bottleneck further based at least in part on the average extent to which the cellular network is busy being greater than the fourth threshold.

4. The UE of claim 1,
wherein, in analyzing the resource allocations to the UE, the UE is configured to determine a state of each of at least a subset of the plurality of transmission time intervals within the burst of network traffic;
wherein the UE is configured to determine that the cellular network is experiencing the bottleneck further based at least in part on the determined states of the at least the subset of the plurality of transmission time intervals within the burst of network traffic.

5. The UE of claim 4,
wherein each transmission time interval comprises a plurality of resource blocks;
wherein, in determining the state of each of at least the subset of the plurality of transmission time intervals within the burst of network traffic, the UE is configured to:
 calculate a percentage of the total number of resource blocks that were allocated to the UE from the base station during each transmission time interval;
 determine the state of each transmission time interval in the burst based on the percentage.

6. The UE of claim 5,
wherein, in analyzing the resource allocations to the UE, the UE is configured to:
 determine a number of transmission time intervals having an active state within the burst of network traffic, wherein the active state indicates that a percentage of resource blocks greater than a threshold in the transmission time interval are allocated to the UE; and
 determine a number of transmission time intervals having a busy state, wherein the busy state indicates that no resource blocks are allocated to the UE within the burst of network traffic;
 determine a percentage of transmission time intervals within the burst of network traffic having a busy state; and
 compare the percentage of transmission time intervals having a busy state with a fourth threshold.

7. The UE of claim 6, wherein the UE is further configured to:
 determine that a respective transmission time interval has the busy state when no resource blocks were received by the UE during the respective transmission time interval and the preceding transmission time interval has the active state;
 determine that the transmission time interval has an idle state when no resource blocks were received by the UE during the respective transmission time interval and the preceding transmission time interval does not have the active state.

8. The UE of claim 1,
wherein the UE is configured to determine a duration for each of a plurality of bursts;
wherein the UE is configured to compute an average burst duration based on the durations of each of the plurality of bursts; and
wherein the UE is configured to determine that the cellular network is experiencing the bottleneck further based at least in part on a determination that the average burst duration of the network traffic is greater than a burst-duration threshold.

9. The UE of claim 1,
wherein the UE receives the network traffic while operating on a first radio access technology (RAT);
wherein the UE is further configured to transition to a second RAT in response to determining that that the cellular network is experiencing the bottleneck.

10. An apparatus for use in a user equipment (UE), the apparatus comprising:
a processor configured to cause the UE to:
 receive network traffic from the cellular network during a series of transmission time intervals, wherein each transmission time interval of the series of transmission time intervals comprises a plurality of respective resource blocks;
 determine a burst of network traffic from the received network traffic;
 calculate a percentage of a total number of resource blocks that were allocated to the UE from the base station during each transmission time interval;
 determine a state of each transmission time interval in the burst based on the percentage, wherein determining the state comprises, for each respective time interval;
  determining that the respective transmission time interval has an active state when the percentage is greater than a first threshold;
  determining that the respective transmission time interval has a last-active state when the percentage is greater than 0% and less than the first threshold;
  determining that the respective transmission time interval has one of a busy state or an idle state when the percentage is 0%;
 determine a duration of the burst of network traffic;
 compare the duration of the burst of network traffic to a burst-duration threshold; and
 determine that the cellular network is experiencing a bottleneck based at least in part on a determination that the duration of the burst of network traffic is greater than the burst-duration threshold.

11. The apparatus of claim 10,
wherein the processor is configured to determine the duration of the burst of network traffic by determining a first active transmission time interval of the burst and a last active transmission time interval of the burst.

12. The apparatus of claim 11,
wherein the processor is configured to determine the first active transmission time interval as a first transmission time interval having an active state immediately preceded by a second transmission time interval with no resource blocks allocated to the UE;
wherein the UE is configured to determine the last active transmission time interval as a third transmission time interval having a nonzero percentage of resource blocks containing data for the UE that is less than a second threshold.

13. The apparatus of claim 10,
wherein the processor is further configured to cause the UE to:
 determine a duration for each of a plurality of bursts; and
 compute an average burst duration based on the durations of each of the plurality of bursts;
wherein the processor is configured to cause the UE to determine that the cellular network is experiencing the bottleneck based at least in part on a determination that the average burst duration of the network traffic is greater than the burst duration threshold.

14. The apparatus of claim 10, wherein the processor is further configured to cause the UE to:
  determine a duration for each of a plurality of bursts;
  compute an average burst duration based on the durations of each of the plurality of bursts; and
  determine that the cellular network is experiencing the bottleneck further based at least in part on a determination that the average burst duration of the network traffic is greater than the burst-duration threshold.

15. The apparatus of claim 10,
  wherein the UE receives the network traffic while operating on a first radio access technology (RAT);
  wherein the processor is further configured to cause the UE to transition to a second RAT in response to determining that that the cellular network is experiencing the bottleneck.

16. A method for operating a user equipment (UE) in a cellular network, the method comprising:
  receiving network traffic from the cellular network during a series of transmission time intervals;
  determining a burst of network traffic from the received network traffic, wherein the burst of network traffic comprises a plurality of transmission time intervals;
  determining a duration of the burst by determining a first active transmission time interval of the burst and a last active transmission time interval of the burst, wherein the UE is configured to determine the first active transmission time interval as a first transmission time interval having an active state immediately preceded by an empty transmission time interval, and wherein the UE is configured to determine the last active transmission time interval as a second transmission time interval having a nonzero percentage of resource blocks containing data for the UE that is less than a first threshold;
  analyzing resource allocations to the UE in each of the plurality of transmission time intervals in the burst to determine an extent to which the cellular network is busy; and
  determining that the cellular network is experiencing a bottleneck based at least in part on the analysis of the resource allocations to the UE in each of the plurality of transmission time intervals in the burst, a determination that the duration of the burst of network traffic is greater than a second threshold, and that the extent to which the cellular network is busy is greater than a third threshold.

17. The method of claim 16,
  wherein, in analyzing the resource allocations to the UE in the plurality of transmission time intervals, the UE is configured to:
    determine a number of transmission time intervals within the burst of network traffic that do not have resources allocated to the UE;
  wherein the UE is configured to determine that the cellular network is experiencing the bottleneck further based at least in part on the determined number of transmission time intervals within the burst of network traffic that do not have resources allocated to the UE.

18. The method of claim 16,
  wherein, in analyzing the resource allocations to the UE in the plurality of transmission time intervals, the method further comprises:
    determining a percentage of transmission time intervals within the burst of network traffic that do not have resources allocated to the UE;
    comparing the percentage to a fourth threshold; and
    determining that the cellular network is experiencing the bottleneck further based at least in part on the percentage exceeding the fourth threshold.

19. The method of claim 16, the method further comprising:
  determining a duration for each of a plurality of bursts;
  computing an average burst duration based on the durations of each of the plurality of bursts; and
  determining that the cellular network is experiencing the bottleneck further based at least in part on a determination that the average burst duration of the network traffic is greater than a burst-duration threshold.

20. The method of claim 16,
  wherein the UE receives the network traffic while operating on a first radio access technology (RAT);
  wherein the method further comprises transitioning the UE to operating on a second RAT in response to determining that that the cellular network is experiencing the bottleneck.

* * * * *